Oct. 23, 1962  J. L. FROSCHER ET AL  3,060,039
PROCESS FOR PRESERVING SOLUTIONS OF HEAT-SENSITIVE MATERIAL
Filed June 2, 1960
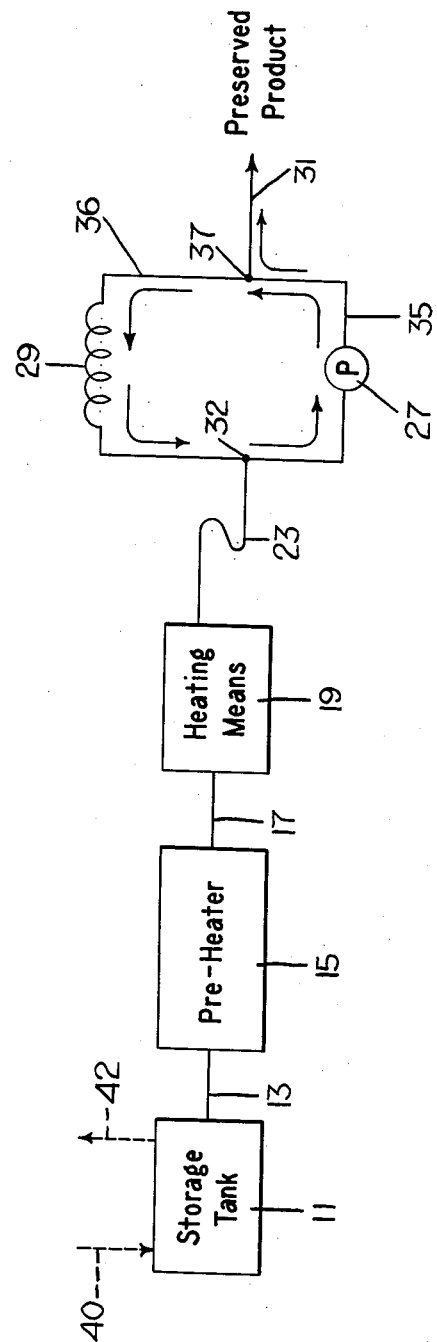
INVENTORS
JAMES L. FROSCHER
VICTOR R. ABRAMS
BY
ATTORNEY ived Oct. 23, 1962

3,060,039
PROCESS FOR PRESERVING SOLUTIONS OF HEAT-SENSITIVE MATERIAL
James L. Froscher, Apopka, Fla., and Victor R. Abrams, Rockford, Ill., assignors to Union Carbide Corporation, a corporation of New York
Filed June 2, 1960, Ser. No. 33,480
5 Claims. (Cl. 99—215)

The present invention relates to a process for preserving solutions of heat-sensitive material and, more particularly, to a process for substantially instantaneously cooling hot solutions of heat-sensitive material.

Heretofore, various solutions have been concentrated or partially dehydrated by freeze concentration methods in order to preserve volatile, flavorous constituents or other qualities which were lost in previous concentration processes. A freeze concentration process is a process wherein a solution is concentrated by freezing a portion of the solvent therefrom and then separating the frozen solvent from the concentrated solution. However, since a solution concentrated by a freeze concentration process is not ordinarily subjected to high temperatures, the resultant concentrated product is usually not very stable. Various methods have heretofore been devised to achieve the desired stability of these freeze-concentrated products, but the preserved product is usually deficient in the very qualities that the freeze concentration process retained in the first place.

The same problem is present in the marketing of various single strength solutions of heat-sensitive material, such as fresh fruit juices. The quality of these products usually deteriorates very rapidly unless they are subjected to some sort of preserving treatment. Although several preserving processes have been proposed in the past, none of these processes has been able to provide a relatively long storage time without deleteriously affecting the quality of the preserved product.

It is, therefore, the main object of the present invention to provide a process for preserving a solution of heat-sensitive materials whereby the desirable qualities of the solution are retained in the preserved product.

Another object of the invention is to provide a process for preserving a solution of heat-sensitive materials whereby the volatile fraction of the solution is retained in the preserved product.

A further object of the invention is to provide a process for preserving a solution of heat-sensitive materials in a non-oxidizing atmosphere.

Other aims and advantages of the present invention will be apparent from the following description and appended claims.

The single FIGURE of the drawing is a flow sheet of a process embodying the present invention.

A major problem in the prior art of freeze concentration has been the frequent instability of the freeze-concentrated products. A similar problem has existed in the marketing of fresh single strength products. These products must be subjected to a preservation treatment in order to destroy or inactivate substances in the solution which cause deterioration during storage. This preservation is usually accomplished by raising the temperature of the solution to a temperature sufficiently high to achieve the desired stability, and then cooling the stabilized product. However, since the stabilizing temperature is usually relatively high and the cooling time relatively long, many of the desirable qualities of the starting material are changed in the preserving process. In the past, it has been recognized that these changes are aggravated by the relatively long cooling periods required, and several processes have been proposed to reduce the cooling period. Some of these processes use a votator to cool the product after it has been heated to the required temperature, the votator providing high heat transfer by the use of agitators. Other methods simply pass the solution over or through cooled plates or tubes. All of these methods have in common the passage of the hot solution over a cooling surface to reduce the temperature, and although cooling may be started immediately after heating, a time interval of several seconds is usually necessary to reduce the temperature to the desired level. In the case of many solutions, such cooling times are prohibitive if certain qualities are to be retained in the preserved product. For example, in the case of orange juice, valuable flavorous constituents are lost during such relatively long cooling times and the preserved juice has a decided cooked flavor.

Another cooling method previously proposed is "flashing" the product into a vacuum chamber. Although this process results in extremely rapid cooling, the vacuum conditions effect the removal of a high percentage of the volatile fraction of the product.

In accordance with the present invention, there is provided a process for preserving a solution of heat-sensitive material comprising raising the temperature of the solution to at least the temperature of pasteurization for the solution, maintaining the solution at that temperature until the desired stability is achieved, and substantially instantaneously cooling the solution by introducing it into a body of pasteurized solution of substantially the same composition and which is maintained at a temperature below that at which significant thermo-chemical change can be produced. Of course, the volume and temperature of the cooling body depend on the volume and temperature of the hot solution to be cooled and the final temperature of the preserved product. For example, if the desired final temperature is lowered and the volume and temperature of the hot solution remain constant, the volume and/or the temperature of the cooling body must be lowered. This relationship can be expressed mathematically as:

$$T_f = \frac{W_h T_h + W_c T_c}{W_h + W_c}$$

wherein $T_f$ is the final temperature of the preserved product; $W_h$ and $T_h$ are the weight and temperature, respectively, of the hot solution; and $W_c$ and $T_c$ are the weight and temperature of the cooling solution. Since both the hot solution and the cooling solution are of substantially the same composition, the specific heats can be neglected.

The temperature of pasteurization is different for different solutions, but is generally defined as a temperature high enough to destroy all pathogenic organisms and most other organisms in the vegetative form, i.e., high enough to effect partial sterilization. The process of the invention may also be used to completely sterilize the solution, i.e., completely destroy or inactivate the enzymatic substances in the solution which cause deterioration during storage. Both pasteurizing and sterilizing temperatures for specific solutions are well known to those skilled in the art. The exact temperature to which the solution is heated will depend entirely upon the degree of stability required in the preserved product. For example, if a refrigerated storage life of 2 weeks were desired for orange juice, it could be heated to a temperature of 175° F. The temperature of the solution may be raised by any convenient means, but the preferred means is steam-injection heating. In this method, the temperature of the solution is raised by subjecting it to the heat and kinetic energy of steam jets passing through the solution, thereby effecting a high heat energy transfer in a very short period of time.

After the temperature of the solution has been raised to the required level, the solution is maintained at that temperature for a period of time sufficient to achieve the desired physical stability, but insufficient to cause objectionable thermo-chemical changes in the solution. Again, the length of the holding period depends entirely on the degree of stability required in the preserved product. For example, in most cases where complete sterility is desired, holding periods of 0.05–1.00 second will be sufficient. The solution can be maintained at the desired temperature by continuing the heat treatment, by means of a holding tube, or by any other convenient means.

The final step of the novel process is rapid cooling of the sterilized solution. This step is critical from a time standpoint, since an appreciable loss of volatile components usually occurs during the cooling period. Substantially instantaneous cooling is accomplished in the process of the invention by passing the hot solution into a cooler, and usually larger, volume of the same solution maintained at a temperature well below that at which significant thermo-chemical change can be produced. By adjusting the volume and temperature of this cooling body according to the aforementioned formula, the hot solution is instantaneously cooled to any desired temperature. The cooling body should be pasteurized and should preferably be of the same composition as the hot solution. This instantaneous cooling insures that there is no quality-deterioration of the heated product as it is cooled.

In order to maintain the cooling body at a constant temperature and to make the invention process completely continuous, the cooling solution is continuously re-circulated through cooling coils. Since the solution cooled by these coils is already at a temperature below that necessary for significant thermo-chemical change, this re-circulation cooling does not result in any loss of flavorous constituents in the cooling body.

The invention will now be more fully described with reference to the drawing. The feed material is contained in storage tank 11 and can be any solution of heat-sensitive material. Heat-sensitive material is any material susceptible to an adverse change in the properties or composition of the material brought about by the pure effect of heat, the degree of change varying with both temperature and time. From the storage tank 11, the concentrated solution is passed through line 13 into a preheater 15. This pre-heating step is usually employed in order to reduce dilution by condensation in the subsequent steam-injection step. Any convenient heat exchanger can be utilized for the pre-heating operation. From pre-heater 15, the warmed solution is passed through line 17 into a heating means 19, which raises the temperature of the solution to a temperature sufficiently high to effect the desired stability. In the preferred heating means for the process of the invention, the temperature of the solution is raised very rapidly by injecting jets of steam into the solution. Clean steam, i.e., free of compounds that will give off flavors in the final product, should be used in this operation.

After the temperature of the solution has been raised to the desired level in heating means 19, the hot solution is passed into a holding tube 23, which is used to provide a holding period sufficient to properly stabilize the solution. Alternatively, the hot solution could be maintained at the desired temperature level by merely retaining it in the heating means 19 for the proper holding period. From the holding tube 23, the heated solution is ejected at junction 32 into a recirculating volume of cooled solution of the same composition, thus effecting substantially instantaneous cooling of the heated solution. From junction 32, pump 27 forces the cool stabilized solution through line 35 to junction 37 where a portion of the solution is removed through line 31. The remaining portion of the solution is re-circulated through line 36 and over cooling coil 29, which continuously maintains the temperature of the re-circulating solution approaching junction 32 at the desired level.

As described above, the volume and temperature of the re-circulating cooling solution are adjusted according to the volume and temperature of the hot solution and the desired final temperature of the preserved product. In the continuous process illustrated in the drawing, the volumes of the heated solution and cooling solution approaching junction 32 are determined by the rates of flow. If the flow rates were equal, orange juice at 100° F. could be cooled at 75° F. by continuously ejecting it into recirculating orange juice at 50° F. However, the temperature of the cooling solution should produce a minimum of thermochemical change. For instance, when orange juice is treated by the inventive process it is desirable that the blended solutions should be at a temperature below 60° F.

To avoid deleterious oxidizing gas contamination of the solution being treated, the head space of the storage tank 11 is blanketed by a non-oxidizing gas supplied through line 40 and exhausted through line 42. In an air-tight system, this blanketing in the storage tank is adequate to protect the solution throughout the preservation process. The gas used may be nitrogen, carbon dioxide, helium, or any other non-oxidizing gas which will not deleteriously affect the product being treated. Of course, the preserved product should also be stored under non-oxidizing conditions. Although the flow rate of the gas comprising the non-oxidizing atmosphere varies with the type of equipment employed, the flow rate should always be such as to maintain a pressure sufficient to insure that any leakage is outward.

In an example of the process of the invention, a quantity of orange juice was concentrated to 51.5° Brix by means of a freeze concentration process and then placed in a storage tank at a temperature of 20° F. Concentrated juice was continuously removed from the tank at the rate of 1.7 gal./min., pre-heated to a temperature of 100° F., and passed into a steam-injection heating means where it was quickly heated to a stabilizing temperature of 220° F. From the steam-injection heating means, the hot juice was passed through a holding tube and ejected into a re-circulating volume of cooled concentrated orange juice. The length of the holding tube was such that the juice remained at the stabilizing temperature for 0.09 second.

While the temperature of the hot juice was kept constant at 220° F., the temperature of the mixed juice in the cooling system stabilized at 70° F. This indicated the hot juice being ejected into the cooling system was being instantaneously cooled to 70° F.

The process was continued with successively higher stabilizing temperatures being employed in the steam-injection heating means. The flow rate and Brix concentration of the feed material were kept the same, and the temperature readings and hold times are shown in the following table.

| Feed Temperature, °F. | Pre-Heat Temperature, °F. | Stabilizing Temperature, °F. | Mixed Temperature, °F. | Hold Time, Seconds |
|---|---|---|---|---|
| 20 | 100 | 220 | 70 | 0.09 |
| 20 | 100 | 240 | 78 | 0.09 |
| 20 | 100 | 260 | 82 | 0.09 |
| 20 | 100 | 280 | 84 | 0.09 |
| 20 | 100 | 300 | 88 | 0.09 |
| 20 | 100 | 318 | 105 | 0.09 |

The preserved orange juice was considerably more palatable than juices preserved by processes employing longer cooling times. This indicated that a substantial portion of the flavorous constituents of the juice were retained by the preserving process of the invention.

In another example, a quantity of milk was concentrated to a solution of 34% solids by means of a freeze concentration process and placed in a storage tank at a temperature of 40° F. The freeze-concentrated milk was removed from the tank at the rate of 2.2 gal./min. and treated by the process of the first example. Temperature and hold time data are shown in the following table.

| Feed Temperature, °F. | Pre-Heat Temperature, °F. | Stabilizing Temperature, °F. | Mixed Temperature, °F. | Hold Time, Seconds |
|---|---|---|---|---|
| 40 | 147 | 300 | 124 | 1.1 |
| 40 | 147 | 290 | 125 | 1.1 |

Since the hot stabilized milk was continuously ejected into the re-circulating cooling system and the mixed temperature in this cooling system remained constant at the temperature shown in the table, it can be seen that cooling was effected substantially instantaneously. Again, the flavor of the preserved milk withdrawn from the cooling system was considerably improved by the novel process.

What is claimed is:

1. A process for preserving a solution of heat-sensitive material comprising:
   (a) increasing the temperature of said solution to a temperature sufficiently high to effect the desired stability;
   (b) maintaining said solution at said temperature until the desired stability is effected;
   (c) substantially instantaneously cooling said solution by introducing and recirculating the stabilized solution in a closed recirculatory system, the temperature and volume of the recirculating solution being adjusted to substantially instantaneously cool the incoming solution to a temperature below that at which significant thermochemical change can be produced, and continuously removing a portion of the cooled solution from said recirculatory system.

2. The process of claim 1 wherein said solution is maintained in non-oxidizing conditions throughout said process.

3. A process for preserving a solution of heat-sensitive material comprising:
   (a) increasing the temperature of said solution to a temperature sufficiently high to effect the desired stability;
   (b) maintaining said solution at said temperature until the desired stability is effected;
   (c) substantially instantaneously cooling said solution by introducing and recirculating the stabilized solution in a closed recirculatory system, the temperature and flow rate of the recirculating solution being adjusted in accordance with the formula $$T_f = \frac{W_h T_h + W_c T_c}{W_h + W_c}$$

to produce a $T_f$ below the temperature at which significant thermochemical change can be produced, and continuously removing a portion of the cooled solution from said recirculatory system, $T_f$ being the temperature of said cooled solution removed from said recirculatory system, $W_h$ and $T_h$ being the flow rate and temperature, respectively, of the hot stabilized solution entering said recirculatory system, and $W_c$ and $T_c$ being the flow rate and temperature, respectively, of the cool solution within said recirculatory system and which is mixed with said hot solution.

4. A process for preserving a solution of heat-sensitive material comprising:
   (a) increasing the temperature of said solution to at least the temperature of pasteurization for said solution;
   (b) maintaining said solution at said temperature until the desired stability is achieved;
   (c) and substantially instantaneously cooling said solution by mixing the hot solution into a recirculating stream of cool solution, continuously removing a portion of the resulting mixed solution, and continuously recirculating a second portion of said mixed solution through a cooling means to form said recirculating stream of cool solution, the temperature and flow rate of said recirculating stream of cool solution being adjusted to substantially instantaneously cool said hot solution to a temperature below that at which significant thermochemical change can be produced.

5. A process for preserving orange juice comprising:
   (a) increasing the temperature of said juice to a temperature sufficiently high to effect the desired stability;
   (b) maintaining said juice at said temperature until the desired stability is achieved;
   (c) and substantially instantaneously cooling said juice by introducing and recirculating the stabilized juice in a closed recirculatory system, the temperature and volume of the recirculating juice being adjusted to substantially instantaneously cool the incoming juice to a temperature below 60° F., and continuously removing a portion of the cooled juice from said recirculatory system.

References Cited in the file of this patent
UNITED STATES PATENTS 2,540,345    Pipkin _____ Feb. 6, 1951
2,712,504    Coulter _____ July 5, 1955